April 13, 1965     J. A. MASON     3,177,995
PILOT OPERATED FRICTION CLUTCH
Filed July 25, 1962
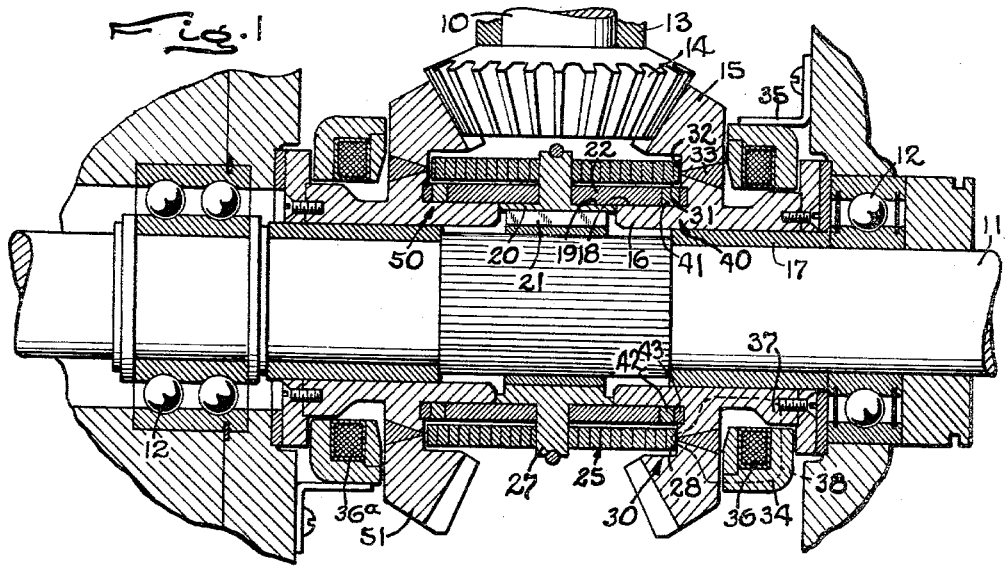
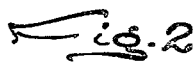
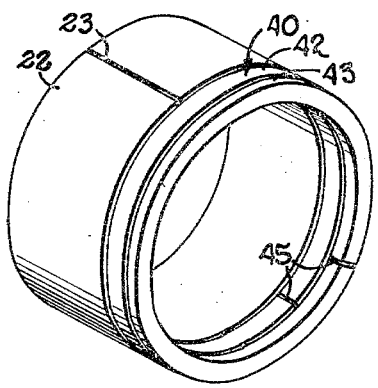
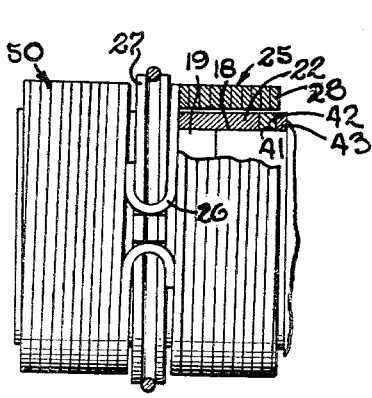
INVENTOR
James A. Mason
By Wolfe, Hubbard, Voit & Osann
ATTORNEY

United States Patent Office 3,177,995
Patented Apr. 13, 1965

3,177,995
PILOT OPERATED FRICTION CLUTCH
James A. Mason, Grand Rapids, Mich., assignor to Warner Electric Brake & Clutch Company, South Beloit, Ill., a corporation of Delaware
Filed July 25, 1962, Ser. No. 212,328
4 Claims. (Cl. 192—35)

This application is a continuation-in-part of my prior application Ser. No. 2,364, filed January 14, 1960 and now Patent No. 3,095,071.

This invention relates to friction clutches and brakes of the so-called coil type in which a free floating arcuate band or shoe is pressed radially into gripping engagement with relatively rotatable surfaces by a helical coil of resilient wire telescoped with the band and wound and unwound under the control of a pilot clutch which is preferably controlled magnetically.

The primary object is to incorporate in a coupling of the above character an auxiliary friction coupling which is activated in response to energization of the main pilot clutch and derives a torque supplementing that of the pilot clutch to thereby amplify the torque exerted on the main actuator coil to compress the floating band.

The invention also resides in the novel and simple character of the amplifying coupling.

Other objects and advantages of the invention will become apparent from the following detailed description taken in connection with the accompanying dawings, in which FIGURE 1 is a longitudinal sectional view through a reversible drive incorporating couplings embodying the present invention.

FIG. 2 is a perspective view of parts of the main and amplifier couplings.

FIG. 3 is a plan view of the actuator coils and their anchors.

For purposes of illustration, the invention is shown in the drawings incorporated in a reversible drive for transmitting rotary power from a unidirectionally rotatable shaft 10 in opposite directions to a driven shaft 11 supported in bearings 12. In this instance, the drive shaft journaled in a bearing 13 carries a bevel gear 14 meshing with a gear 15 having a hub journaled on the shaft 11 through a bearing sleeve 17. One end portion 16 of the hub constitutes a driving drum having an external surface 18 which is cylindrical in this instance and of the same diameter as the surface 19 of a driven drum in the form of a sleeve 20 keyed at 21 to the driven shaft and disposed substantially in end abutment therewith.

Overlapping and telescoping with the adjacent end portions of the two drum surfaces 18 and 19 is a free floating band 22 composed of friction material such as ordinary brake lining split as indicated at 23 and adapted to be collapsed radially into gripping engagement with the drums to couple the driving member 15 to the driven shaft. The main friction clutch thus formed is engaged by a helical coil 25 of resilient wire telescoped around the band and having one end 26 (FIG. 3) hooked around one end of a radial flange 27 integral with the driven sleeve 20 near one side of the band. The turn 28 at the opposite end of the coil is free and constitutes the armature of a magnetic pilot clutch 30 having inner and outer pole faces 31 and 32 formed on the inner and outer parts of the driving member 15 and disposed in a common axial plane on opposite sides of a non-magnetic ring 33 brazed to and rigidly joining the pole pieces.

An L-shaped core 34 of magnetic material stationarily supported by a bracket 35 encloses and supports a multiple turn winding 36 and opposes the back of the outer pole piece while telescoping with a hub 37 on the inner pole piece. The magnetic parts thus positioned cooperate to define a circuit 38 through which, when the winding 36 is energized, magnetic flux threads from the pole pieces into and out of the armature 28 thus attracting the latter into gripping engagement with the pole faces to derive a friction torque applied to the armature in a direction to wind up the coil 36 and contract the band to engage the main friction clutch. The coil is allowed to unwind and release the clutch when the winding is deenergized.

The invention also contemplates the provision of means rendered operative in response to activation of the pilot clutch 30 to derive an additional friction torque supplementing the pilot clutch torque in winding up the actuator coil 25 and contracting the same around the band 22. Generally stated, this means comprises a secondary pilot clutch 40 which is engaged by the change in diameter of the coil 25 resulting from energization of the main pilot clutch 30 and which has a driving surface rotatable with the driving drum and a driven surface formed on one or more turns of the coil 25 which are disposed beyond the side edge of the friction band 22.

In the present instance, the secondary pilot clutch 40 includes a third and cylindrical drum whose surface 41 constitutes an extension of the driving drum surface 18 and telescopes within the end turn 28 of the actuator coil 25 and several adjacent turns formed by employing a coil of a length greater than the width of the band. While the secondary friction torque may be derived by the direct engagement of the third drum 41 and the coil extension, the clutch 40 is formed by the coaction of these elements with one or more collapsible rings 42, 43 lying side by side and telescoped between the surface 41 and the coil end. Like the band 22, these rings are composed of resilient metal or friction material preferably of rectangular cross-section and split as indicated at 45 so as to be contractible around and into gripping engagement with the drum surface 41. In this instance, the rings are of substantially the same radial thickness as the band.

With this arrangement, it will be apparent that the rings 42, 43 float freely and loosely on the extension 41 of the driving drum 16 and within the actuator coil 25 when the pilot clutch 30 is deenergized and the main clutch is released. Now when the coil 36 is energized and the end turn 28 is drawn axially into gripping engagement with the rotating pole faces 21, 32, the coil 25 will be wound up and thus contracted around and into gripping engagement with the outer peripheries of the rings and then, in the continued contraction of the coil, the rings, like the band 25 are collapsed and compressed against the rotating drum surface. Such gripping of the drum by the rings induces turning of the latter and the application of a supplemental friction torque to the inner surfaces of the turns at the free end of the coil 25. Being derived from the same drum as the torque of the pilot clutch, this supplemental torque acts in the same direction so as to amplify the pilot torque in winding up the actuating coil thereby increasing the compression of the band. By varying the number atnd widths of the amplifier rings 41, 42, it will be apparent that the supplemental torque may be varied as desired according to the over-all torque amplification desired. For most applications, the secondary pilot clutch 40 will provide a major part of the actuating torque thus permitting of a corresponding reduction in the size and capacity of the magnetic pilot clutch.

It will be apparent that the supplemental actuating torque thus derived presists throughout reversals of the load torque for the reasons above described and until the pilot clutch 30 is released by deenergization of the magnet coil 36. When this occurs, the end turn 28 is released and, by virtue of its resiliency, the coil 25 unwinds automatically. This relieves the pressure on the amplifier rings 41, 42 and thus releases the secondary clutch 40 in the same way that the main band clutch is released.

As indicated at 50, the clutch mechanism thus far described is duplicated at the other end of the shaft 11 so that by energizing a magnet winding 36$^a$ a bevel gear 51 continuously rotated by the driving gear 14 may be coupled frictionally to the shaft and the latter caused to turn in a direction opposite to that resulting from engagement of the clutch first described. Thus, a reversing drive may be produced by a compact arrangement of two of the present clutches.

I claim as my invention:

1. A friction coupling having, in combination, two members disposed end to end and mounted for relative turning about a common axis, annular friction surfaces on the respective members, one of said members being a driver, a free floating friction band extending around said surfaces for free turning relative thereto, said band being split and changeable in diameter to grip said surfaces frictionally and thereby transmit torque from the driving member to the other member, a third annular surface rigid with said driver and disposed adjacent the side of the band and extending axially therefrom but outwardly beyond the latter, a multiple turn helical coil loosely telescoped with said band and said third surface and normally out of clutching engagement therewith, means anchoring one end of said coil to one of said members, the turn at the other end of the coil being free and extending around said third surface for gripping engagement therewith, a pilot friction clutch operable when activated to derive a torque from the turning of said driving member and apply such torque to opposite ends of said coil to change the diameter of the coil in a direction to compress said band against said first two surfaces, said coil projecting along said driving member beyond the edge of said band with said free turn overlapping said third surface, and an arcuate free floating and radially expansible and contractible friction member disposed alongside said band between said third surface and said free end turn of said coil so as to be compressed between such surface and end turn during compression of said band by the coil and thereby derive a secondary friction torque augmenting the torque of said pilot clutch in changing the diameter of said coil.

2. A coupling as defined by claim 1 in which said floating friction member comprises a split ring of resilient material.

3. A coupling as defined by claim 2 including at least one additional split ring telescoped between said third surface and said coil and disposed axially between said ring and the adjacent end of said band so as to be pressed against said third surface by said coil whereby to derive a further friction torque augmenting said secondary torque in changing the diameter of said coil.

4. A friction coupling having, in combination, two members disposed end to end and mounted for relative turning about a common axis, annular friction surfaces on the respective members, one of said members being a driver, a free floating friction band extending around said surfaces for free turning relative thereto, said band being split and changeable in diameter radially to grip said surfaces frictionally and thereby transmit torque from the driving member to the other member, a multiple turn helical coil loosely telescoped with said band, means anchoring one end of said coil to one of said members, the turn at the other end of the coil being free and presenting an exposed axially facing surface disposed substantially in a plane normal to said axis, a first pilot friction clutch having an element adapted for axial gripping engagement with said axially facing surface to derive a first friction torque from the turning of said driving member when the pilot clutch is actuated and apply such torque to said free end turn in a direction to compress said band against said members, and means between said free end turn and a portion of said driving member alongside said band including radially opposed concentric surfaces brought into gripping engagement with each other during compression of said band by said actuator coil and coacting to form an auxiliary friction clutch engaged during compression of said band by said coil and deriving a secondary friction torque acting in the direction of the torque of said axially engageable pilot clutch to augment the torque of the latter in further changing the diameter of said coil and the compression of said band thereby.

References Cited by the Examiner

UNITED STATES PATENTS

| 2,214,487 | 9/40 | Starkey. |
| 2,566,539 | 9/51 | Starkey. |
| 2,574,714 | 11/51 | Smith. |
| 2,742,126 | 4/56 | Morton. |
| 2,798,581 | 7/57 | Supitilov _____ 192—81 X |

DAVID J. WILLIAMOWSKY, *Primary Examiner.*

THOMAS J. HICKEY, *Examiner.*